Patented July 28, 1953

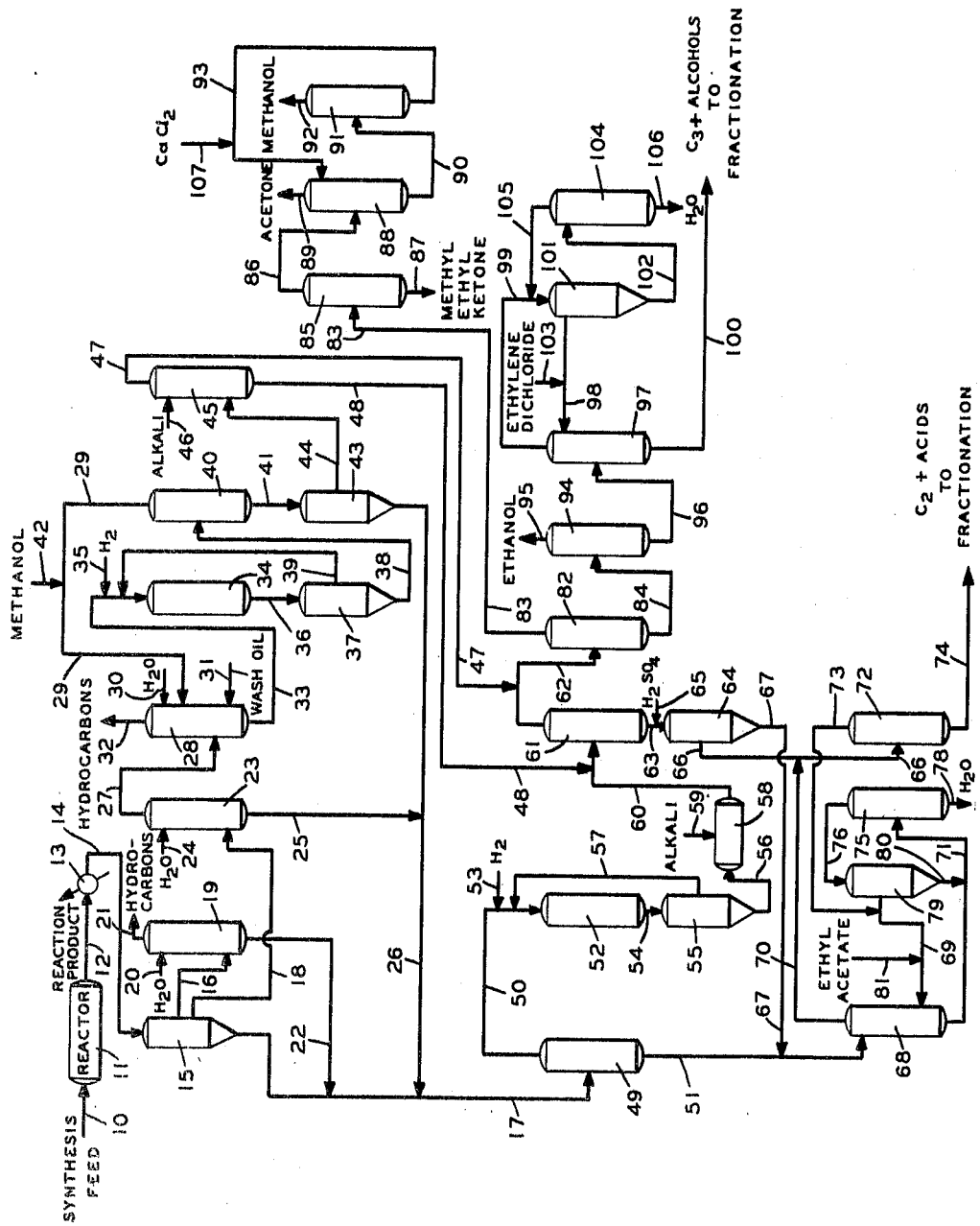

2,647,139

UNITED STATES PATENT OFFICE 2,647,139

SEPARATION OF ORGANIC COMPOUNDS

William P. Burton, Orange, N. J., assignor to The M. W. Kellogg Company, Jersey City, N. J., a corporation of Delaware Application March 31, 1948, Serial No. 18,202

12 Claims. (Cl. 260—450)

This invention relates to the separation of organic compounds and relates more particularly to an improved process for the separation of oxygenated organic compounds from the reaction product obtained in the catalytic hydrogenation of oxides of carbon at elevated temperatures. Still more particularly, the invention relates to an improved process for the separation and recovery of oxygenated organic compounds from hydrocarbons present in the reaction product obtained in the hydrogenation of oxides of carbon in the presence of a reducible metal catalyst, wherein these oxygenated compounds comprise essentially alcohols, acids, esters, aldehydes and ketones.

It is, therefore, an object, and the process of this invention is directed, to provide for an improved process for the separation of the aforementioned oxygenated organic compounds from hydrocarbons present in the reaction product obtained in the catalytic hydrogenation of oxides of carbon, in order to effect efficient and economical recovery of relatively high yields of such compounds.

Other objects and advantages inherent in the invention will be apparent from the following more detailed disclosure.

The accompanying drawing illustrates diagrammatically, one form of the apparatus employed and capable of carrying out one embodiment of the process of the invention. While the invention will be described in detail by reference to the embodiment of the process employing the apparatus illustrated in the drawing, it should be noted that it is not intended that the invention be limited thereto, but is capable of other embodiments which may extend beyond the scope of the apparatus illustrated. Furthermore, the distribution and circulation of liquids and vapors is illustrated in the drawing by a diagrammatic representation of the apparatus employed. Valves, pumps, compressors, coolers, and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, a synthesis feed comprising a reaction mixture of hydrogen and an oxide of carbon, at varying mol ratios, such as 2:1, is supplied through line 10 and transferred through this line to a synthesis reaction vessel represented in the drawing by reactor 11. In reactor 11 the reaction mixture is contacted with a hydrogenation catalyst, such as a reduced iron or cobalt catalyst, at temperatures varying between about 300° F. and about 700° F. and at pressures varying between about atmospheric pressure and about 500 pounds per square inch, and is carried out according to conventional fixed-bed or fluid-bed operations. The resulting reaction product obtained from reactor 11 is withdrawn through line 12. This product is in the vapor form substantially as it comes from the reactor within the aforementioned temperature range, containing water, methane and higher hydrocarbons, and oxygenated organic compounds comprising $C_2$ and higher acids, aldehydes, ketones, esters, and methanol and higher alcohols, and is first cooled to condense substantially large quantities of normally liquid components. Conveniently, condensation may be effected in a plurality of cooling stages which are represented diagrammatically in the drawing by cooler 13 with which line 12 connects. From cooler 13 the resulting mixture of condensate and uncondensed gases passes through line 14 to a separator 15. In the latter the gases are withdrawn through line 16 and the condensate separates as a lower aqueous phase and an upper oil phase. Both phases, thus obtained, contain oxygenated organic compounds; those of lower molecular weight tending to remain in the aqueous phase, while those of higher molecular weight tend to remain in the oil phase. The aqueous phase is drawn off from the bottom of separator 15 through line 17, and the oil phase is drawn off at an intermediate point through line 18. It should be noted that apparatus embodying more than one separation stage may be employed, if desired; for example, primary and secondary separation stages may be introduced, operating successively and respectively at temperatures of about 150° F. and about 100° F.

The gases separated in separator 15 are passed through line 16 to a low point in a suitable scrubbing vessel 19. In this gas scrubber, the gases are intimately contacted with water in order to extract the oxygenated compounds present. For this purpose water in introduced into scrubber 19 through line 20. The remaining gas, essentially free of oxygenated organic compounds and comprising light hydrocarbons, is withdrawn overhead through line 21 for further use or treatment outside the scope of the present process. The remaining mixture of oxygenated organic compounds comprising alcohols, aldehydes, ketones, acids and esters is transferred from tower 19 through line 22 and combined with the aqueous phase withdrawn from separator 15 through line 17, for further treatment in the process hereinafter described.

The oil phase separated in separator 15 is transferred through line 18 to a low point in an oil scrubber 23 in which the oil is contacted intimately with water to absorb in the water the oxygenated compounds which are dissolved in the oil and which are relatively more soluble in water, such as the low-boiling alcohols, ketones, aldehydes and acids. Water employed for this purpose is introduced to the upper part of scrubber 23 through line 24. The scrubbing water containing dissolved oxygenated compounds is withdrawn from the bottom of oil scrubber 23 through line 25 and is transferred through line 26 and combined with the aqueous product withdrawn from the separator 15 through line 17, for further treatment in the process hereinafter described.

The scrubbed oil is withdrawn overhead from oil scrubber 23 through line 27. This oil comprising essentially a mixture of organic acids, alcohols, esters, aldehydes, ketones and hydrocarbons is transferred through line 27 to a low point in an extraction tower 28. In tower 28 the oil introduced through line 27 is subjected to intimate counter-current contact with a light alcohol as a treating agent, such as methanol or ethanol, which is introduced into tower 28 at an upper point through line 29. The alcohol treating agent and the oil are contacted in tower 28 under conditions effective to absorb in the treating agent substantially all of the oxygenated compounds contained in the oil and thus effect separation of these oxygenated compounds from hydrocarbons present. As a result of such treatment, a lower aqueous alcohol layer and an upper hydrocarbon or oil layer are formed in tower 28. Inasmuch as anhydrous light alcohols exhibit high solubilities for hydrocarbons as well as for oxygenated compounds, dilution of such alcohols will effect an improvement in the selectivity of extraction, so that absorption of hydrocarbons in the alcohol treating agent is substantially prevented. To obtain such dilution, water is introduced into tower 28 at an upper point above the alcohol inlet through line 30. The use of water in the manner described is effective not only for the purpose of alcohol dilution, but its introduction at an upper point in tower 28, accomplishes the result of washing the upper hydrocarbon or oil layer free of the added alcohol treating agent.

Aqueous methanol used as a treating agent in the present embodiment is not, however, completely selective in effecting total extraction of oxygenated organic compounds from hydrocarbons present in tower 28. Hence, the liquid flowing down tower 28 will contain some hydrocarbons in solution in addition to oxygenated organic compounds. These hydrocarbons may comprise a mixture of proportionately small quantities of all the hydrocarbons present in the oil stream entering tower 28 through line 27 and would render separation of pure oxygenated compounds highly difficult. A light hydrocarbon stream functioning as a wash-oil is, therefore, introduced at a point near the bottom of tower 28 through line 31. This hydrocarbon stream effects the washing of the lower aqueous methanol layer in tower 28, free of hydrocarbons contained therein, leaving the methanol layer saturated with the wash-oil. It is desirable that this wash-oil be of such composition that there are no components present in a substantial amount, that are heavier than the highest boiling hydrocarbon which forms an azeotrope with the alcohol treating agent. The boiling point of the wash-oil selected must, therefore, be substantially within or below the boiling range of the oxygenated compounds that are to be separated. Hence, I may use such wash-oils as butane, pentane, hexane, or heptane or mixtures thereof. Following the above-mentioned wash-oil treatment, there is present in tower 28 an upper hydrocarbon or oil layer containing substantially all the hydrocarbons that were present in the oil stream entering tower 28 through line 27 and a portion of the wash-oil, and there is also present a lower aqueous methanol layer saturated with wash-oil and containing extracted oxygenated compounds. The upper hydrocarbon or oil layer is withdrawn overhead as a raffinate from tower 28 through line 32 and is in condition for further use or treatment outside the scope of the present process. The lower aqueous methanol layer from tower 28 is withdrawn as an extract through line 33.

The lower aqueous methanol layer from tower 28 saturated with wash-oil and containing the aforementioned extracted oxygenated compounds comprising a mixture of organic acids, alcohols, esters, aldehydes and ketones is transferred through line 33 to a hydrogenation reactor 34. Reactor 34 is provided for effecting catalytic selective hydrogenation, by conventional methods, of aldehydes present in the aforementioned mixture to their corresponding alcohols, in order to avoid aldehyde polymerization or acetal formation which would otherwise make subsequent separation of these compounds from aldehydes present, exceedingly difficult, and to reduce the number of steps which would otherwise be required in separating the components of the mixture. Hydrogen employed in reactor 34 is introduced through line 35 via line 33, with which line 35 connects. Following the conversion of aldehydes into alcohols in hydrogenation reactor 34, the product of the reaction is withdrawn as bottoms through line 36. Bottoms thus obtained are cooled and transferred through line 36 to a separator 37. In separator 37, separation is obtained between alcohols, acids, esters and ketones which are withdrawn as bottoms through line 38, and free hydrogen which is recycled to reactor 34 through line 39, via line 33, with which line 39 connects. It should be noted, that if so desired, ketones in addition to aldehydes present in reactor 34 may also be selectively hydrogenated to alcohols, although in the present embodiment of the invention such hydrogenation is not effected.

The aqueous mixture of alcohols, acids, esters, and ketones withdrawn as bottoms from separator 37 is transferred through line 38 to a fractionation tower 40. Tower 40 functioning as a methanol stripper, is operated under conditions effective to separate the aqueous methanol layer, transferred from tower 34, into an overhead alcohol fraction comprising essentially methanol and wash-oil which is withdrawn through line 29, and a lower fraction normally consisting of two phases, one phase comprising substantially oxygenated compounds and the other phase comprising substantially water, containing some dissolved oxygenated compounds. These combined phases are withdrawn as bottoms through line 41. The overhead alcohol fraction from tower 40 is withdrawn through line 29 as a vapor and is cooled to liquefy methanol and hydrocarbon components present. The mixture of methanol and hydrocarbons thus liquefied is transferred through line 29 into tower 28 for repeated use as the methanol treating agent in the process hereinbefore described. Make-up methanol is introduced through line 29 via line 42, with which line 29 connects. Bottoms from tower 40 comprising an aqueous mixture of oxygenated compounds, namely, alcohols, ketones, acids and esters are cooled and transferred through line 41 to a settler 43. In settler 43 separation is effected between the aforementioned oxygenated compounds which are withdrawn through line 44 as an upper oil layer, containing water-insoluble oxygenated organic compounds and a lower water layer containing some water-soluble oxygenated compounds which is withdrawn through line 26 and combined with the aforementioned aqueous phase withdrawn from separator 15 through line 17, with which line 26 connects, for further use in the process hereinafter described.

The above-mentioned oxygenated compounds withdrawn as an upper oil layer from settler 43 are transferred through line 44 to a caustic treater 45. In treater 45 the oil layer introduced through line 44 is treated with alkali or an aqueous solution of an alkali to neutralize organic acids present, and such alkali may be also introduced in increased quantities under suitable conditions of temperature effective to saponify esters. Alkali thus employed converts organic acids contained in the oil layer to their corresponding alkali salts. For this purpose, the oil thus introduced into tower 45 is intimately mixed with alkali in a suitable amount which is introduced at an upper point through line 46.

As a result of the treatment of the aforementioned oxygenated compounds in treater 45, there are present in this treater an upper layer comprising alcohols and non-hydrogenated ketones, which are withdrawn overhead through line 47 and a lower aqueous layer containing salts of organic acids which is withdrawn as bottoms through line 48 for further use or treatment in the process hereinafter described.

While it is preferred to use methanol as an overall generally suitable treating agent in tower 28 in the process described, other light alcohols such as ethanol or propanol may also be successfully employed. Ethanol or propanol are less selective as solvents than methanol. However, their use in combination with increased quantities of water to improve their selectivity may be desirable, in that the size of tower 28 may be decreased, effecting proportionate savings in the cost of equipment. In addition, it should be noted that it is possible to use a mixture of light alcohols as a treating agent in the process described, as well as individual light alcohol treating agents. Furthermore, other types of alcohols such as glycols may be successfully used. In addition, other types of oxygenated organic compounds or mixtures of such compounds, substantially more volatile than the bulk of oxygenated compounds being recovered, may be used as treating agents. For example, such oxygenated organic compounds as ketones may be employed, as acetone or methyl ethyl ketone. In addition, these compounds may be employed individually or in combination with the aforementioned alcohols as treating agents. In general, the selection of a suitable treating agent will depend upon the use of such oxygenated compounds as can easily be separated from extracted chemicals.

As described above, the aqueous phase withdrawn as bottoms from separator 15 contains low molecular weight oxygenated compounds comprising chiefly light alcohols and light acids. In addition, relatively small quantities of aldehydes, ketones and esters are also present. This aqueous phase from separator 15, combined with the aforementioned oxygenated compounds present in line 22 and low-boiling alcohols, ketones, aldehydes and acids present in line 26, is next transferred through line 17 to a distillation tower 49, which functions as an alcohol stripper. In tower 49 the mixture of oxygenated compounds is heated under proper operating conditions of temperature and pressure effective to distill overhead alcohols, aldehydes, ketones and esters which are withdrawn through line 50. Bottoms obtained from tower 49, compriisng an aqueous solution of organic acids, are withdrawn through line 51 for further treatment in the process hereinafter described.

The overhead from tower 49 comprising a mixture of light alcohols, aldehydes, ketones and esters, is next transferred through line 50 to a hydrogenation reactor 52. Reactor 52 is provided for effecting catalytic selective hydrogenation, by conventional methods, of aldehydes present in the aforementioned mixture to their corresponding alcohols, in order to avoid aldehyde polymerization or acetal formation which would otherwise make the subsequent separation of these compounds difficult and to reduce the number of steps which would otherwise be required in separating the components of the mixture. Hydrogen employed in reactor 52 is introduced through line 53 via line 50, with which line 53 connects. As a result of the conversion of aldehydes into alcohols in hydrogenation reactor 52, the product of the reaction is withdrawn as bottoms through line 54. Bottoms thus obtained are cooled and transferred through line 54 to a separator 55. In separator 55, separation is obtained between alcohols, esters and ketones which are withdrawn as bottoms through line 56, and free hydrogen which is recycled to reactor 52 through line 57, via line 50 with which line 57 connects.

The above-mentioned aqueous mixture, withdrawn from separator 55 through line 56 and comprising alcohols, esters and ketones, is next transferred through line 56 to a caustic treater 58. In treater 58 the mixture introduced through line 56 is treated with alkali or an aqueous solution of an alkali to neutralize any traces of organic acids that may be present, that were not separated in tower 49. Such alkali may also be introduced in increased quantities under suitable conditions of temperature effective to saponify esters. Alkali thus employed, converts organic acids and the acid portion of the esters contained in the mixture entering treater 58 through line 56, to their corresponding alkali salts. For this purpose, the mixture thus introduced into treater 58 is intimately mixed with alkali, in a suitable amount, which is introduced through line 59.

As a result of the treatment of the aforementioned oxygenated compounds in treater 58, there is present in this treater a mixture of water-soluble alcohols, ketones, excess alkali and salts of organic acids. This mixture is next transferred from treater 58 through line 60 to a distillation tower 61. Tower 61 is operated under conditions of temperature and pressure effective to distill overhead an aqueous mixture of the alcohols and ketones present which is withdrawn through line 62 for further treatment in the process hereinafter described. Bottoms from tower 61 comprising an aqueous mixture of salts of organic acids and excess alkali are withdrawn through line 63. It should be noted at this point that the aforementioned lower aqueous layer containing salts of organic acids withdrawn from treater 45 through line 48, may be combined with the mixture of water-soluble alcohols, ketones, excess alkali and salts of heavy organic acids introduced into tower 61, through line 60 with which line 48 connects. In addition, the aforementioned upper layer from treater 45 comprising ketones, which is withdrawn through line 47 may be combined with the aqueous mixture of alcohols and ketones withdrawn overhead from tower 61 through line 62, with which line 47 connects, for further treatment in the process hereinafter described.

As described above, bottoms from tower 61, comprising an aqueous mixture of salts of organic acids and excess alkali are withdrawn through line 63. In accordance with the process of the invention, this mixture is next subjected to further treatment in order to release organic acids present from their salts. This mixture is, therefore, transferred through line 63 to a separator 64. In separator 64 a high-boiling inorganic acid having a boiling point higher than that of water, such as sulfuric acid, or an inorganic acid which forms a maximum boiling azeotrope with water, such as hydrochloric acid, is introduced through line 65, with which line 63 connects, in order to effect neutralization of the aforementioned salts. The resulting mixture in separator 64, comprising free organic acids and salts of the introduced inorganic acid, will separate into an upper acid-rich phase comprising chiefly relatively heavier organic acids which have separated from the water solution by reason of their insolubility, and a portion of the lighter organic acids, and a lower water-rich phase, comprising inorganic salts and a portion of the relatively lighter acids. The upper phase from separator 64 is withdrawn through line 66, for further treatment as hereinafter described, while the lower phase is withdrawn through line 67 and combined with the aforementioned aqueous solution of light organic acids withdrawn from stripper 49 through line 51. This combined stream is next transferred to an extraction tower 68. In tower 68 the stream introduced through line 51 is subjected to intimate counter-current contact with an oxygen-containing solvent treating agent as an acid extractor, such as ethyl acetate, ethyl ether, isopropyl ether, or ketones such as methyl propyl ketone and the like, which is introduced into tower 68 through line 69. The treating agent and the aqueous stream of organic acids are contacted in tower 68 under conditions effective to absorb in the treating agent a large proportion of the water contained in the aqueous stream of organic acids passing through line 51. The extract thus produced comprises an acid-rich mixture containing organic acids, excess solvent treating agent and proportionately small quantities of water, and is withdrawn overhead from tower 68 through line 70. Bottoms from tower 68 comprising a raffinate containing a portion of the solvent treating agent and proportionately large quantities of water, are withdrawn through line 71.

The extract from tower 68 comprising an acid-rich mixture containing organic acids, excess solvent treating agent and proportionately small quantities of water, is withdrawn overhead through line 70 and is combined with the aforementioned upper acid-rich phase comprising relatively heavy organic acids withdrawn from separator 64 through line 66 and is transferred through line 66 to a distillation tower 72, which functions as a stripper for the solvent treating agent. Tower 72 is heated under conditions effective to distill overhead a mixture containing all of the solvent treating agent and water present in line 66 which is withdrawn through line 73, and is transferred through this line into line 69, with which line 73 connects for further use as the solvent in tower 68 in the process described above. Bottoms from tower 72 comprising anhydrous $C_2$ and heavier organic acids, solvent-free, are withdrawn through line 74, and may be transferred to any conventional acid fractionation system in which individual acids may be recovered for further use outside the scope of the present process.

As hereinbefore described, the raffinate from tower 68 contains a portion of the solvent treating agent and proportionately large quantities of water. This raffinate is next transferred through line 71 to a distillation tower 75. Tower 75 is heated under conditions of temperature and pressure effective to distill overhead water-azeotropes of the solvent treating agent which are withdrawn through line 76. Bottoms from tower 75, comprising excess water, are withdrawn through line 78. The water-azeotropes of the solvent treating agent, which are withdrawn overhead from tower 75 through line 76 are transferred into a separator 79. In separator 79 separation is effected between an upper layer, comprising the solvent treating agent, and a lower water-layer which is withdrawn as bottoms through line 80 and is transferred, via line 71, for treatment in tower 75 in the process described above. The upper layer from separator 79, comprising the solvent treating agent, is withdrawn through line 69 for further use in tower 68 as described above. Make-up solvent is introduced into line 69 through line 81 with which line 69 connects.

It should be noted that while I prefer to use ethyl acetate as the solvent in the aforementioned acid extraction step, the process of the invention is not limited solely to its use; other solvents may be advantageously employed, such as ethyl ether, isopropyl ether, or ketones such as methyl propyl ketone and the like. Ethyl ether may have particular desirability in instances where cross-esterification and hydrolysis are encountered, when ethyl acetate is used as a solvent. Where such is the case and ethyl ether is used as a solvent, a proportionately larger volume of solvent would be required. In order to obtain an anhydrous stream where ethyl ether is used, the ether-water azeotrope can best be removed at a pressure of approximately 100 pounds per square inch absolute. In addition to using solvents which are lower boiling than the acids to be extracted, it is possible to use high-boiling alcohols, ketones, and organic acids in other modifications of the process described above.

As indicated above, the combined stream in line 62 comprises an aqueous mixture of $C_2$ and higher alcohols and ketones. This mixture is next transferred through line 62 to a distillation tower 82. In tower 82 the mixture is heated to distill overhead a mixture of the lowest boiling alcohol-ketone components, namely, methanol, acetone and methyl ethyl ketone, which are withdrawn through line 83. Bottoms from tower 82 comprising $C_2$ and higher alcohols are withdrawn through line 84 for further treatment in the process hereinafter described. The overheads from tower 82, comprising the aforementioned mixture of methanol, acetone and methyl ethyl ketone, are transferred through line 83 to a distillation tower 85. In tower 85 the mixture is heated under proper operating conditions of temperature and at a super-atmospheric pressure of about 100 pounds per square inch, to distill overhead the lowest boiling components of the mixture, namely, acetone and methanol which are withdrawn through line 86. Bottoms from tower 85 comprising methyl ethyl ketone, are recovered through line 87.

The acetone-methanol overhead from tower 85 is transferred through line 86 to an extraction tower 88. In tower 88 the mixture is subjected to extractive-distillation with an aqueous solution of an inorganic salt in which methanol is soluble, such as calcium chloride or sodium thiosulfate which is introduced into tower 88 through line 93. The overhead from tower 88, comprising acetone is withdrawn through line 89. Bottoms from tower 88, comprising an aqueous mixture of the solvent and methanol is withdrawn through line 90. This mixture is next transferred through line 90 to a distillation tower 91. In tower 91 the mixture is heated under proper conditions of temperature and atmospheric pressure to distill overhead methanol in a substantially pure state, which is withdrawn through line 92. Bottoms from tower 91, comprising the aforementioned solvent, is withdrawn through line 93 and are recycled through this line for further use in tower 88 in the process described above. Make-up quantities of the solvent are introduced into line 93 through line 107, with which line 93 connects.

The aqueous mixture of $C_2$ and higher alcohols obtained as bottoms from tower 82 is transferred through line 84 to a fractionation tower 94. Tower 94 is operated under proper conditions of temperature and pressure effective to distill overhead aqueous ethanol, which is withdrawn through line 95. Bottoms from tower 94, comprising an aqueous mixture of $C_3$ and higher alcohols, are withdrawn through line 96. These bottoms are next subjected to dehydration and are accordingly transferred through line 96 to a distillation tower 97. An entrainer, such as ethylene dichloride or ethyl acetate, is introduced into tower 97 through line 98. Tower 97 is heated under conditions effective to distill overhead as azeotropes with the entrainer, water that is present in the alcohol stream entering tower 97 through line 96. Following treatment in tower 97, an overhead comprising a mixture of the entraining agent and water is withdrawn through line 99. Bottoms from tower 97, comprising dehydrated $C_3$ and higher alcohols, are withdrawn through line 100 and may be transferred to any conventional alcohol fractionation system in which individual alcohols may be recovered for further use, outside the scope of the present process.

Overheads from tower 97 comprising a mixture of the entraining agent and water are cooled and transferred through line 99 to a separator 101. In separator 101 there are present, by reason of the water-insolubility of the entrainer, an upper layer comprising the entraining agent which is withdrawn through line 98, and a lower aqueous layer containing proportionately smaller quantities of the entraining agent which is withdrawn through line 102. The upper layer from separator 101, comprising the entraining agent, is recycled through line 98 to tower 97 for reuse. Make-up quantities of entraining agent are introduced into line 98 through line 103, with which line 98 connects.

The lower aqueous layer from separator 101, containing proportionately small quantities of entraining agent, is transferred through line 102 to a distillation tower 104. Tower 104 is operated under conditions of temperature and pressure effective to distill overhead the entraining agent and azeotropic quantities of water, which are withdrawn through line 105. Water obtained as bottoms from tower 104 is withdrawn through line 106. The overhead from tower 104, comprising the entraining agent and water, may be transferred through line 105 into line 99, with which line 105 connects, for separation of entraining agent and water in separator 101, in the process described above.

To recapitulate, this invention is directed to a process for the separation of oxygenated organic compounds from the reaction product obtained in the catalytic hydrogenation of oxides of carbon where such compounds comprise essentially light and heavy alcohols and organic acids, aldehydes, ketones and esters. However, while the invention has particular applicability to the separation of these compounds from the source indicated, the process of the invention is not necessarily restricted to effecting the desired separation of these compounds as derived from the aforementioned source. The process of the invention may also be successfully applied to the separation of any mixtures of the aforementioned compounds, without regard to the source from which these mixtures may have been derived and without regard to the composition of such mixtures. In addition, while a particular embodiment of the invention has been described for purposes of illustration, it should be understood that various modifications and adaptations thereof, which will be obvious to one skilled in the art, may be made within the spirit of the invention as set forth in the appended claims.

I claim:

1. A process for treating the reaction product obtained in the hydrogenation of oxides of carbon wherein said product comprises a mixture of hydrocarbons and oxygenated organic compounds comprising alcohols, acids, aldehydes and ketones, which comprises: cooling said product to effect substantial condensation of normally liquid components to form an oil product liquid phase and a water product liquid phase, each of said phases containing at least a portion of said oxygenated compounds; separately water scrubbing said oil product liquid phase to obtain a water layer comprising water-soluble oxygenated compounds and an oil layer comprising oil-soluble oxygenated compounds and hydrocarbons; subjecting said oil layer to extraction treatment with an aqueous solution of a water-soluble alcohol to obtain a raffinate containing hydrocarbons and an extract containing oil-soluble oxygenated compounds; subjecting said extract to selective hydrogenation to convert aldehydes present to their corresponding alcohols and to form a mixture comprising alcohols and ketones; separating alcohols from ketones in the mixture thus produced; combining said water layer from water-scrubbing of said oil product liquid phase with said water product liquid phase; fractionating the combined mixture into a relatively high boiling fraction comprising organic acids and a relatively low boiling fraction comprising alcohols, aldehydes and ketones; subjecting said relatively low boiling fraction to selective hydrogenation to convert aldehydes present to their corresponding alcohols and to form a mixture comprising alcohols and ketones; and separating alcohols from ketones in the mixture thus produced.

2. A process for treating the reaction product obtained in the hydrogenation of oxides of carbon wherein said product comprises a mixture of hydrocarbons and oxygenated organic compounds comprising alcohols, acids, aldehydes and ketones, which comprises: cooling said product to effect substantial condensation of normally liquid components to form an uncondensed gas phase, an oil product liquid phase and a water product liquid phase, each of said phases containing at least a portion of said oxygenated compounds; separately water-scrubbing said uncondensed gas phase to obtain an extract comprising water-soluble oxygenated compounds; separating said extract from said uncondensed gas phase; separately water-scrubbing said oil product liquid phase to obtain a water layer comprising water-soluble oxygenated compounds and an oil layer comprising oil-soluble oxygenated compounds and hydrocarbons; separating said layers; combining the extract from water-scrubbing of said uncondensed gas phase and the water layer from water-scrubbing of said oil product liquid phase with said water product liquid phase; fractionating the combined mixture into a relatively high boiling fraction comprising organic acids and a relatively low boiling fraction comprising alcohols, aldehydes and ketones; subjecting said relatively low boiling fraction to selective hydrogenation to convert aldehydes present to their corresponding alcohols and to form a mixture comprising alcohols and ketones; and separating alcohols from ketones in the mixture thus produced.

3. A process for treating the reaction product obtained in the hydrogenation of oxides of carbon wherein said product comprises a mixture of hydrocarbons and oxygenated organic compounds comprising alcohols, acids, aldehydes and ketones, which comprises: cooling said product to effect substantial condensation of normally liquid components to form an uncondensed gas phase, an oil product liquid phase, and a water product liquid phase, each of said phases containing at least a portion of said oxygenated compounds; separately water-scrubbing said uncondensed gas phase to obtain an extract comprising water-soluble oxygenated compounds; separating said extract from said uncondensed gas phase; separately water-scrubbing said oil product liquid phase to obtain a water layer comprising water-soluble oxygenated compounds and an oil layer comprising oil-soluble oxygenated compounds and hydrocarbons; separating said layers; subjecting said oil layer to extraction treatment with an aqueous solution of a water-soluble alcohol to obtain a raffinate containing hydrocarbons and an extract containing oil-soluble oxygenated compounds; subjecting said last mentioned extract to selective hydrogenation to convert aldehydes present to their corresponding alcohols and to form a mixture comprising alcohols and ketones; separating alcohols from ketones in the mixture thus produced; combining the extract from water-scrubbing of said uncondensed gas phase and the water layer from water-scrubbing of said oil product liquid phase with said water product liquid phase; fractionating the combined mixture into a relatively high boiling fraction comprising organic acids and a relatively low boiling fraction comprising alcohols, aldehydes and ketones; subjecting said relatively low boiling fraction to selective hydrogenation to convert aldehydes present to their corresponding alcohols and to form a mixture comprising alcohols and ketones; and separating alcohols from ketones in the mixture thus produced.

4. A process for treating the reaction product obtained in the hydrogenation of oxides of carbon wherein said product comprises a mixture of hydrocarbons and oxygenated organic compounds comprising alcohols, acids, aldehydes and ketones, which comprises: cooling said product to effect substantial condensation of normally liquid components to form an uncondensed gas phase, an oil product liquid phase, and a water product liquid phase, each of said phases containing at least a portion of said oxygenated compounds; separately water-scrubbing said uncondensed gas phase to obtain an extract comprising water-soluble oxygenated compounds; separating said extract from said uncondensed gas phase; separately water-scrubbing said oil product liquid phase to obtain a water layer comprising water-soluble oxygenated compounds and an oil layer comprising oil-soluble oxygenated compounds and hydrocarbons; separating said layers; subjecting said oil layer to extraction treatment with an aqueous solution of a water soluble alcohol to obtain a raffinate phase containing hydrocarbons and an extract containing oil-soluble oxygenated compounds; contacting said last-mentioned extract with a hydrocarbon wash-oil which is readily separable from said oil-soluble oxygenated compounds by distillation to absorb hpdrocarbons present in said extract; separating hydrocarbons from the extract thus treated; subjecting the remainder of said last-mentioned extract to selective hydrogenation to convert aldehydes present to their corresponding alcohols and to form a mixture comprising alcohols and ketones; separating alcohols from ketones in the mixture thus produced; combining the extract from water-scrubbing of said uncondensed gas phase and the water layer from water scrubbing of said oil product liquid phase with said water product liquid phase; fractionating the combined mixture into a relatively high boiling fraction comprising organic acids and a relatively low boiling fraction comprising alcohols, aldehydes and ketones; subjecting said relatively low boiling fraction to selective hydrogenation to convert aldehydes present to their corresponding alcohols and to form a mixture comprising alcohols and ketones; and separating alcohols from ketones in the mixture thus produced.

5. The process of claim 4 wherein said water-soluble alcohol is methanol.

6. The process of claim 4 wherein said water-soluble alcohol is ethanol.

7. The process of claim 4 wherein said water-soluble alcohol is propanol.

8. The process of claim 4 wherein said wash-oil is pentane.

9. The process of claim 4 wherein said wash-oil is hexane.

10. The process of claim 4 wherein said wash-oil is heptane.

11. The process of claim 4 wherein said water-soluble alcohol is a glycol.

12. The process of claim 4 wherein said wash-oil is butane.

WILLIAM P. BURTON.

References Cited in the file of this patent

UNITED STATES PATENTS

| Number | Name | Date |
|---|---|---|
| 1,830,469 | Keyes | Nov. 3, 1931 |
| 1,921,381 | Beller et al. | Aug. 8, 1933 |
| 1,939,237 | Stone | Dec. 12, 1933 |
| 1,943,427 | Franzen et al. | Jan. 16, 1934 |
| 2,059,495 | Smeykal | Nov. 3, 1936 |
| 2,205,184 | Woodhouse | June 18, 1940 |
| 2,452,121 | Grahame | Oct. 26, 1948 |
| 2,457,257 | Michael et al. | Dec. 28, 1948 |
| 2,470,782 | McGrath et al. | May 24, 1949 |
| 2,472,219 | Lyons | June 7, 1949 |
| 2,505,752 | Burton | May 2, 1950 |
| 2,516,940 | Arnold et al. | Aug. 1, 1950 |
| 2,533,675 | Marschner | Dec. 12, 1950 |
| 2,539,393 | Arnold et al. | Jan. 30, 1951 |